US008762683B2

(12) United States Patent  (10) Patent No.: US 8,762,683 B2
Wang et al.  (45) Date of Patent: Jun. 24, 2014

(54) DEVICE AND METHOD FOR MEMORY ADDRESSING

(75) Inventors: Chih-Min Wang, Hsinchu (TW); Chao-Ping Su, Hsinchu County (TW); Yi-Lung Tsai, Jhonghe (TW); Ming-Hong Huang, Hsinchu County (TW)

(73) Assignee: MStar Semiconductor, Inc. (TW)

( * ) Notice: Subject to any disclaimer, the term of this patent is extended or adjusted under 35 U.S.C. 154(b) by 864 days.

(21) Appl. No.: 12/287,961

(22) Filed: Oct. 15, 2008

(65) Prior Publication Data

US 2009/0100245 A1  Apr. 16, 2009

(30) Foreign Application Priority Data

Oct. 16, 2007  (TW) .............................. 096138598 A

(51) Int. Cl.
*G06F 12/00*  (2006.01)
*G06F 13/00*  (2006.01)
*G06F 13/28*  (2006.01)

(52) U.S. Cl.
USPC .................... 711/206; 711/202; 711/E12.001; 711/E12.058

(58) Field of Classification Search
CPC ........................... G06F 12/0284; G06F 12/109
USPC ................... 711/206, 202, E12.001, E12.058
See application file for complete search history.

(56) References Cited

U.S. PATENT DOCUMENTS

| | | | | |
|---|---|---|---|---|
| 3,938,096 A | * | 2/1976 | Brown et al. .................. | 711/209 |
| 4,521,846 A | * | 6/1985 | Scalzi et al. .................. | 711/209 |
| 5,611,065 A | * | 3/1997 | Alferness et al. ............. | 711/220 |
| 5,696,927 A | * | 12/1997 | MacDonald et al. ......... | 711/207 |
| 5,699,542 A | * | 12/1997 | Mehta et al. .................. | 711/202 |
| 5,757,690 A | * | 5/1998 | McMahon ..................... | 365/104 |
| 5,828,891 A | * | 10/1998 | Benayoun et al. ............. | 710/269 |
| 6,233,667 B1 | * | 5/2001 | Shaylor et al. ................ | 711/203 |
| 7,496,713 B1 | * | 2/2009 | Ward et al. .................... | 711/141 |
| 2003/0101307 A1 | * | 5/2003 | Gemelli et al. ............... | 710/305 |
| 2003/0123461 A1 | * | 7/2003 | Riley ............................. | 370/401 |
| 2003/0204702 A1 | * | 10/2003 | Lomax et al. ................. | 711/207 |
| 2006/0112256 A1 | * | 5/2006 | Lee ............................... | 711/205 |
| 2006/0282752 A1 | | 12/2006 | Kuroda | |
| 2007/0073996 A1 | * | 3/2007 | Kruger et al. ................. | 711/207 |

FOREIGN PATENT DOCUMENTS

| | | |
|---|---|---|
| CN | 1149185 | 10/1995 |
| CN | 1848097 | 4/2006 |
| TW | 376477 | 10/1995 |
| TW | 200636464 | 4/2006 |

* cited by examiner

*Primary Examiner* — Sheng-Jen Tsai

(57) ABSTRACT

An addressing device and method is provided to enable an electronic system having a less addressing capability to address a memory device having a larger storage space, thereby reducing the manufacture cost of the electronic system. The addressing device includes an address decoder and an address translator. The address decoder receives a first access address belonging to a smaller address space, and determines whether to map the first access address to the larger storage space of the memory device. The address translator is coupled to the address decoder. When the first access address is mapped to the storage space of the memory device, the address translator translates the first access address into a second access address of the larger storage space according to an adjustable base address.

10 Claims, 3 Drawing Sheets

DEVICE AND METHOD FOR MEMORY ADDRESSING

BACKGROUND OF INVENTION

1. Field of the Invention

The present invention relates to memory addressing, and more particularly to an addressing device and method which can enable an electronic system having a less addressing capability to address a larger memory.

2. Description of the Prior Art

In an electronic system, when the microcontroller (or the microprocessor) executes a program or data processing task, it needs a memory or register to save data temporarily. In general, the microcontroller has only a limited memory addressing capability which limits the size of the memory that the microcontroller can address. For example, if the memory addressing capability of the microcontroller is just 64K in size, the microcontroller cannot directly address a memory over 64K bytes. Since the function of the electronic system is increasingly complicated, the memory that the microcontroller can afford to address may not be sufficient for use.

However, if a microcontroller having a greater memory addressing capability is used instead, it will cause the manufacture cost of the electronic system to be much higher, which is unfavorable to the price competitiveness of the manufacturer.

SUMMARY OF INVENTION

It is therefore one objective of the present invention to provide an addressing device and method which can enable an electronic system having a less addressing capability to address a memory device having a larger storage space, thereby reducing the manufacture cost of the electronic system.

An addressing device for addressing a memory device according to an address space is provided. The memory device has a storage space. The addressing device comprises: an address decoder for receiving a first access address of the address space and determining whether to map the first access address to the storage space of the memory device; and an address translator, coupled to the address decoder, for translating the first access address into a second access address of the storage space according to an adjustable first base address when the first access address is mapped to the storage space of the memory device.

An addressing method for addressing a memory device according to an address space is provided. The memory device has a storage space. The addressing method comprises: receiving a first access address of the address space; determining whether to map the first access address to the storage space of the memory device; and translating the first access address into a second access address of the storage space according to an adjustable first base address when the first access address is mapped to the storage space of the memory device.

DETAILED DESCRIPTION OF PREFERRED EMBODIMENTS

Figure 1:
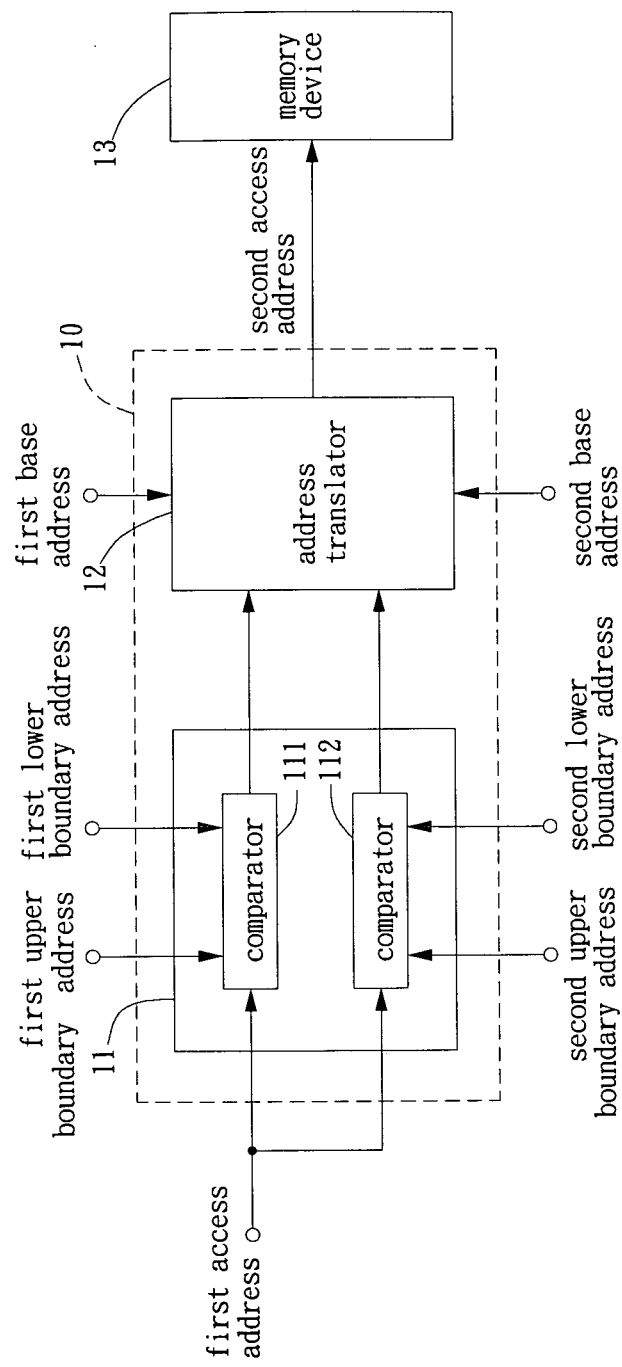
FIG. 1 is a block diagram of an addressing device according to an embodiment of the present invention.

FIG. 1 is a block diagram of an addressing device according to an embodiment of the present invention. The addressing device 10 can address a memory device 13 according to the addresses of an address space. An address space means a set of addresses, and the number of the addresses represents the size of the address space. The greater the number of the addresses is, the larger the address space becomes. The size of the address space represents the addressing capability of the address space. An address space having a stronger addressing capability can address a larger storage space. For example, a 64K address space has 64K addresses; if each address is corresponding to one byte of storage space, then the storage space that the 64K address space can directly address is 64K bytes. In a preferred embodiment, the storage space that the address space can directly address is smaller than the storage space of the memory device 13. That is, the size of the storage space of the memory device 13 exceeds the addressing capability of the first address space. For example, the address space may have a 64K size (including hexadecimal addresses 0000 to FFFF), while the storage space of the memory device 13 may have a size of 64M bytes (including hexadecimal addresses 0000000 to 3FFFFFF). That is, the addressing device 10 can address the memory device 13 having the larger storage space according to the smaller address space. The memory device 13 may include a dynamic random access memory (DRAM) or a flash memory, etc.

Figure 2:
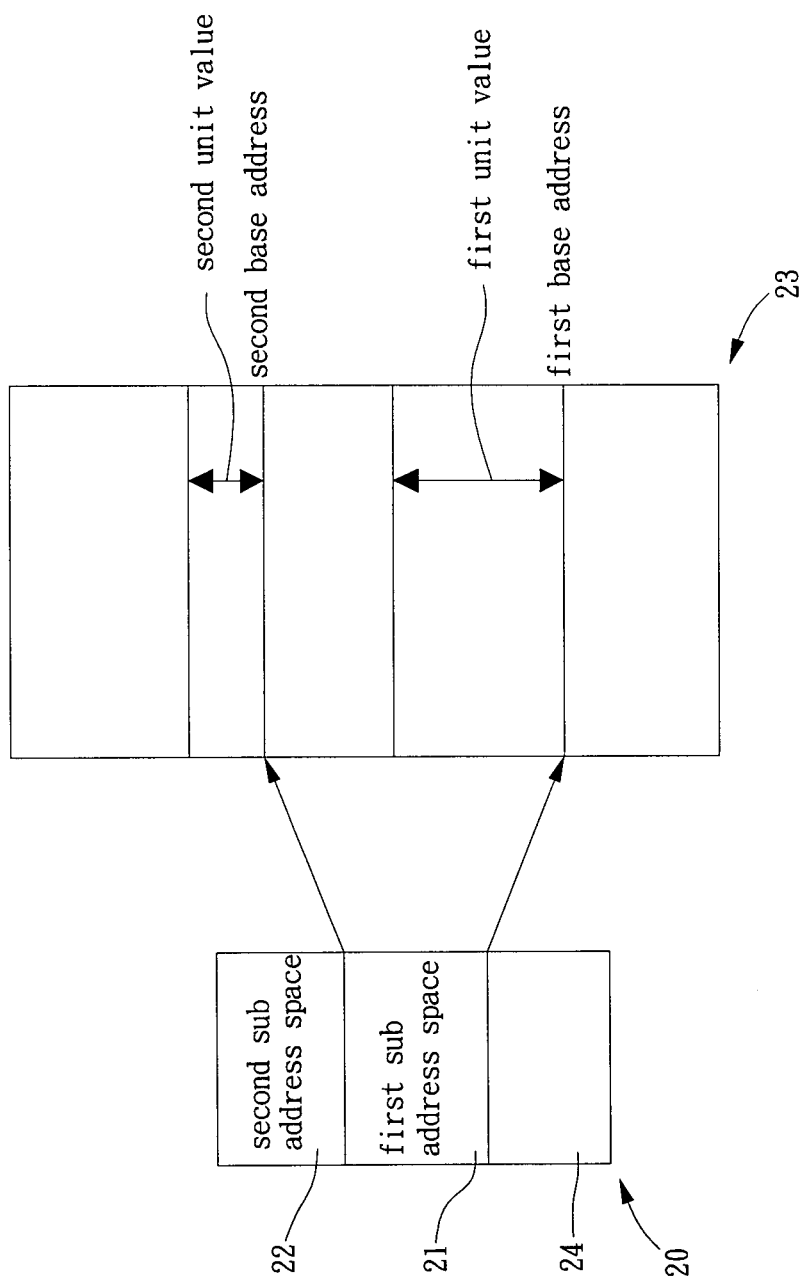
FIG. 2 shows the mapping relationship between an address space and the storage space of the memory device in FIG. 1.

FIG. 2 shows the mapping relationship between the address space 20 and the storage space 23 of the memory device 13. The address space 20 includes a first sub address space 21 and a second sub address space 22, both of which do not overlap. Addresses of the first sub address space 21 are mapped to between a first base address of the storage space 23 and the first base address plus a first unit value. Addresses of the second sub address space 22 are mapped to between a second base address of the storage space 23 and the second space address plus a second unit value. The first base address and the second base address can be adjusted by respectively using the first unit value and the second unit value as unit. Thus, for the first sub address space 21, the storage space 23 is divided into a plurality of pages and each of the pages has a size of the first unit value. The case is similar for the second sub address space 22, except that the size of each page is the second unit value. In other words, by means of adjusting the first base address and the second base address, addresses of the first sub address space 21 and the second sub address space 22 can be respectively mapped to various address sections of the storage space 23. Thus, the addressing device 10 can enable an electronic system having a less addressing capability to address a larger storage space.

Although the first sub address space 21 and the second sub address space 22 do not overlap, the address sections of the storage space 23 mapped by the first sub address space 21 and the second sub address space 22 can still overlap by means of adjusting one or both of the first and second base addresses to be close to each other. That is, the data at the same address of the storage space 23 can be accessed via different addresses in different sub address spaces of the address space 20, thereby achieving the effect of data sharing.

In a preferred embodiment, the second unit value is smaller than the first unit value such that the storage space 23 can be fully used. For example, if the first unit value is 64K and the first sub address space 21 is smaller than 64K, then part of the address section of each page (each page having the size of 64K, i.e. the first unit value) of the storage space 23 will not be mapped when the first sub address space 21 is mapped to the storage space 23. At this time, the smaller second unit value (e.g. 4K) can be used to adjust the second base address to be mapped to the above non-mapped part of the address section, which then can be mapped by the second sub address space 22. In this manner, the address section not mapped by the first sub address space 21 can still be accessed via the second sub address space 22, so as to fully use the storage space 23.

As shown in FIG. 1, the addressing device 10 includes an address decoder 11 and an address translator 12. The address decoder 11 receives a first access address of the address space 20, and determines whether to map the first access address to the memory device 13. The address translator 12 is coupled to the address decoder 11. When the first access address is mapped to the memory device 13, the address translator 12 translates the first access address into a second access address of the storage space 23 of the memory device 13.

The address decoder 11 includes two comparators 111 and 112. The comparator 111 receives the lower boundary address and upper boundary address of the first sub address space 21 (referred as first lower boundary address and first upper boundary address respectively), and compares both of them with the first access address. If the first access address lies between the first lower boundary address and the first upper boundary address, it means the first access address belongs to the first sub address space 21, and the address decoder 11 provides the first access address to the address translator 12 which then performs address translation to map the first access address to the memory device 13. The comparator 112 receives the lower boundary address and upper boundary address of the second sub address space 22 (referred as second lower boundary address and second upper boundary address respectively), and compares both of them with the first access address. If the first access address lies between the second lower boundary address and the second upper boundary address, it means the first access address belongs to the second sub address space 22, and the address decoder 11 provides the first access address to the address translator 12 which then performs address translation to map the first access address to the memory device 13.

When the first access address belongs to the first sub address space 21, the address translator 12 translates the first access address into a second access address according to the first base address. For example, the second access address can be the first base address plus the first access address or the first base address plus a part of the first access address (e.g. a plurality of least significant bits of the first access address). When the first access address belongs to the second sub address space 22, the address translator 12 translates the first access address into the second access address according to the second base address. For example, the second access address can be the second base address plus the first access address or the second base address plus a part of the first access address.

In one embodiment, the first access address is provided by a microcontroller (not shown) equipped with the address space 20, and the memory device 13 includes a DRAM controller and a DRAM (not shown). In the address space 20, except the first sub address space 21 and the second sub address space 22 which need the address translation as mentioned above so as to be mapped to the memory device 13, all the remaining sub address space 24 is directly mapped to other functional blocks such as the SRAM or registers within the microcontroller for storing various information required for system operation (e.g. for storing the first and second lower boundary addresses and the first and second upper boundary addresses), without need of any address translation. Thus, the address decoder 11 determines the section of the address space 20 (i.e. first sub address space 21, second sub address space 22 or remaining sub address space 24) which the first access address provided by the microcontroller belongs to, and then performs the corresponding addressing. In addition, the DRAM controller generates a physical address for accessing the DRAM according to the second access address provided by the address translator 12.

Figure 3:
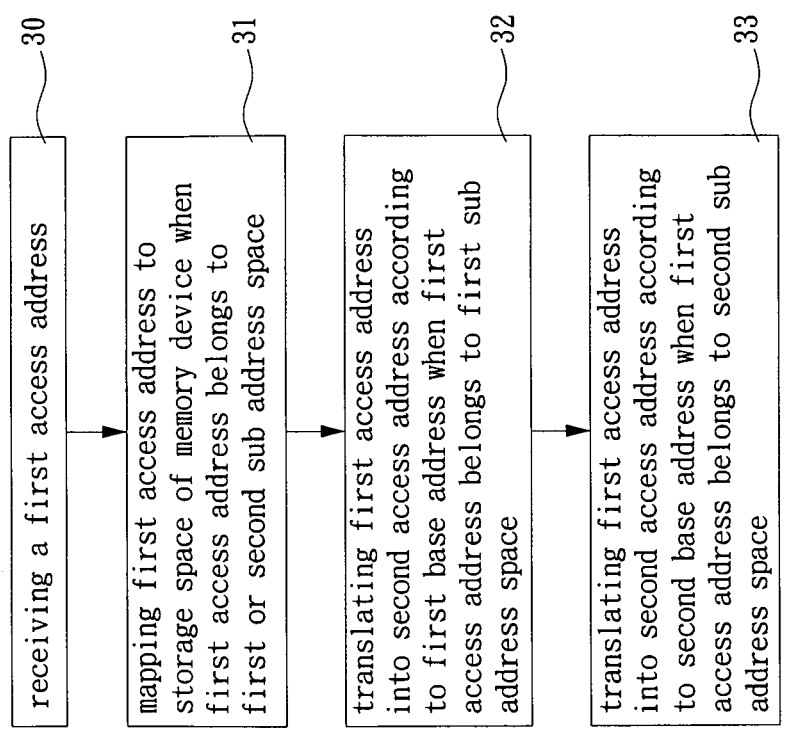
FIG. 3 shows a flow chart of an addressing method according to an embodiment of the present invention.

FIG. 3 shows a flow chart of an addressing method according to an embodiment of the present invention. The addressing method can be used to address a memory device according to the addresses of an address space. The storage space that the address space can directly address is smaller than the storage space of the memory device, and the address space includes a first sub address space and a second sub address space, both of which do not overlap. The addressing method includes the following steps:

Step 30: receiving a first access address in the address space.

Step 31: mapping the first access address to the storage space of the memory device when the first access address belongs to the first sub address space or the second sub address space.

Step 32: translating the first access address into a second access address of the storage space of the memory device according to an adjustable first base address when the first access address belongs to the first sub address space.

Step 33: translating the first access address into the second access address according to an adjustable second base address when the first access address belongs to the second sub address space.

The first base address is adjusted by using a first unit value as unit, and the second base address is adjusted by using a second unit value as unit. The second unit value is smaller than the first unit value.

In an embodiment, the step 32 adds the first access address or a part of the first access address (such as a plurality of least significant bits of the first access address) to the first base address so as to generate the second access address. The step 33 adds the first access address or a part of the first access address to the second base address so as to generate the second access address.

While the present invention has been shown and described with reference to the preferred embodiments thereof and in terms of the illustrative drawings, it should not be considered as limited thereby. Various possible modifications and alterations could be conceived of by persons skilled without departing from the scope and the spirit of the present invention.

What is claimed is:

1. An addressing device for addressing a memory device according to an address space, the memory device having a storage space, the addressing device comprising:

an address decoder for receiving a first access address of the address space and determining whether to map the first access address to the storage space of the memory device; and an address translator, coupled to the address decoder, for translating the first access address into a second access address of the storage space according to an adjustable first base address when the first access address is mapped to the storage space of the memory device;

wherein the address space comprises a first sub address space and a second sub address space; when the first access address belongs to the first sub address space or the second sub address space, the address decoder maps the first access address to the storage space of the memory device;

wherein when the first access address belongs to the first sub address space, the address translator translates the first access address into the second access address according to the first base address; when the first access address belongs to the second sub address space, the address translator translates the first access address into the second access address according to an adjustable second base address;

wherein the first base address is adjusted according to a first unit value, and the second base address is adjusted according to a second unit value;

wherein the second unit value is smaller than the first unit value;

wherein both the first sub address space and the second sub address space do not overlap, address sections of the storage space mapped by the first sub address space and the second sub address space are overlapped by means of adjusting one or both of the first and second base addresses to be close to each other.

2. The addressing device of claim 1, wherein a storage space which the address space can directly address is smaller than the storage space of the memory device.

3. The addressing device of claim 1, wherein the second access address is the first base address plus the first access address or the first base address plus a part of the first access address.

4. The addressing device of claim 1, wherein the address decoder comprises:
   a comparator for comparing the first access address with a lower boundary address and an upper boundary address of the sub address space respectively.

5. The addressing device of claim 1, wherein when the first access address belongs to the first sub address space, the second access address is the first base address plus the first access address or the first base address plus a part of the first access address; when the first access address belongs to the second sub address space, the second access address is the second base address plus the first access address or the second base address plus a part of the first access address.

6. The addressing device of claim 1, wherein the address decoder comprises:
   a first comparator for comparing the first access address with a lower boundary address and an upper boundary address of the first sub address space respectively; and
   a second comparator for comparing the first access address with a lower boundary address and an upper boundary address of the second sub address space respectively.

7. An addressing method for addressing a memory device having a storage space according to an address space, the addressing method comprises steps of:
   receiving a first access address of the address space;
   determining whether to map the first access address to the storage space of the memory device; and
   translating the first access address into a second access address of the storage space according to an adjustable first base address when the first access address is mapped to the storage space of the memory device;
   wherein the address space comprises a first sub address space and a second sub address space; when the first access address belongs to the first sub address space or the second sub address space, the first access address is mapped to the storage space of the memory device;
   wherein when the first access address belongs to the first sub address space, the first access address is translated into the second access address according to the first base address; when the first access address belongs to the second sub address space, the first access address is translated into the second access address according to an adjustable second base address;
   wherein the first base address is adjusted according to a first unit value, and the second base address is adjusted according to a second unit value;
   wherein the second unit value is smaller than the first unit value;
   wherein both the first sub address space and the second sub address space do not overlap, address sections of the storage space mapped by the first sub address space and the second sub address space are overlapped by means of adjusting one or both of the first and second base addresses to be close to each other.

8. The addressing method of claim 7, wherein a storage space which the address space can directly address is smaller than the storage space of the memory device.

9. The addressing method of claim 7, wherein the second access address is the first base address plus the first access address or the first base address plus a part of the first access address.

10. The addressing method of claim 7, wherein when the first access address belongs to the first sub address space, the second access address is the first base address plus the first access address or the first base address plus a part of the first access address; when the first access address belongs to the second sub address space, the second access address is the second base address plus the first access address or the second base address plus a part of the first access address.

* * * * *